US011787411B2

(12) United States Patent
Terai

(10) Patent No.: US 11,787,411 B2
(45) Date of Patent: Oct. 17, 2023

(54) SHIFT MODE CONTROL SYSTEM

(71) Applicant: SUBARU CORPORATION, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/151,050

(22) Filed: Jan. 6, 2023

(65) Prior Publication Data

US 2023/0264695 A1     Aug. 24, 2023

(30) Foreign Application Priority Data

Feb. 24, 2022  (JP) .................................. 2022-026618

(51) Int. Cl.

| F16H 61/02 | (2006.01) |
| F16H 61/08 | (2006.01) |
| B60W 30/19 | (2012.01) |
| B60W 30/182 | (2020.01) |
| B60W 40/08 | (2012.01) |

(52) U.S. Cl.
CPC .......... B60W 30/19 (2013.01); B60W 30/182 (2013.01); B60W 40/08 (2013.01); F16H 61/02 (2013.01); F16H 61/08 (2013.01); B60W 2510/1005 (2013.01); B60W 2540/043 (2020.02); F16H 2061/0244 (2013.01)

(58) Field of Classification Search
CPC .. F16H 61/02; F16H 61/08; F16H 2061/0244; B60W 30/19; B60W 30/182; B60W 40/08; B60W 2510/1005; B60W 2540/043

See application file for complete search history.

(56) References Cited

U.S. PATENT DOCUMENTS

| 6,363,805 | B1 * | 4/2002 | Marchart | ............ F16H 59/0204 |
| | | | | 74/335 |
| 6,622,581 | B2 * | 9/2003 | Seidel | ................. F16H 59/0204 |
| | | | | 74/335 |
| 2021/0078604 | A1 * | 3/2021 | Namba | ............... B60W 40/109 |

FOREIGN PATENT DOCUMENTS

| JP | 2008-051262 A | | 3/2008 | |
| JP | 2014152840 A | * | 8/2014 | ............. F16H 61/00 |
| JP | 6007811 B2 | * | 10/2016 | ............. F16H 61/00 |

* cited by examiner

Primary Examiner — Tisha D Lewis
(74) Attorney, Agent, or Firm — McDermott Will & Emery LLP

(57) ABSTRACT

A shift mode control system includes a control apparatus that controls a shift mode of a vehicle, a first operation device that receives a first operation to switch an automatic mode to a manual mode, and a second operation device that receives a second operation to switch the manual mode to the automatic mode. The control apparatus includes a processor that calculates a speed ratio change amount that is a difference between a first speed ratio set when the automatic mode is switched to the manual mode in accordance with the first operation and a second speed ratio set when the manual mode is switched to the automatic mode in accordance with the second operation. The processor updates the speed ratio change amount set as a switching condition for automatically switching the manual mode to the automatic mode to the speed ratio change amount calculated by the processor.

6 Claims, 5 Drawing Sheets

SHIFT MODE CONTROL SYSTEM

CROSS-REFERENCE TO RELATED APPLICATIONS

The present application claims priority from Japanese Patent Application No. 2022-026618 filed on Feb. 24, 2022, the entire contents of which are hereby incorporated by reference.

BACKGROUND

The disclosure relates to a shift mode control system.

Some existing automatic transmissions to be mounted on vehicles have an automatic shift mode and a manual shift mode. In the automatic shift mode, shifting is automatically controlled, whereas, in the manual shift mode, shifting is controlled in accordance with an operation performed by a driver who drives the vehicle. Some of the automatic transmissions automatically switch from the manual shift mode to the automatic shift mode when a traveling distance of the vehicle reaches a predetermined distance. Further, an automatic transmission is known that changes the predetermined distance as needed on the basis of past operations performed by the driver. For example, Japanese Unexamined Patent Application Publication (JP-A) No. 2008-51262 discloses a technique of performing learning correction to shorten the predetermined distance for determining whether automatic switching to the automatic shift mode is to be performed in a case where a manual operation to return the shift mode to the automatic shift mode is performed before a traveling distance of the vehicle reaches the predetermined distance.

SUMMARY

An aspect of the disclosure provides a shift mode control system including a control apparatus, a first operation device, and a second operation device. The control apparatus is configured to control a shift mode of a vehicle. The first operation device is configured to receive a first switching operation to switch the shift mode from an automatic shift mode in which shifting of the vehicle is automatically controlled to a manual shift mode in which the shifting of the vehicle is controlled in accordance with an operation performed by a driver who drives the vehicle. The second operation device is configured to receive a second switching operation to switch the shift mode from the manual shift mode to the automatic shift mode. The control apparatus includes a processor and a memory coupled to the processor. The processor is configured to calculate a speed ratio change amount which is a difference between a first speed ratio set when the shift mode is switched from the automatic shift mode to the manual shift mode in accordance with the first switching operation performed on the first operation device and a second speed ratio set when the shift mode is switched from the manual shift mode to the automatic shift mode in accordance with the second switching operation performed on the second operation device. The processor is further configured to update the speed ratio change amount set as a switching condition for automatically switching the shift mode from the manual shift mode to the automatic shift mode to the speed ratio change amount calculated by the processor.

An aspect of the disclosure provides a shift mode control system including a control apparatus, a first operation device, and a second operation device. The control apparatus is configured to control a shift mode of a vehicle. The first operation device is configured to receive a first switching operation to switch the shift mode from an automatic shift mode in which shifting of the vehicle is automatically controlled to a manual shift mode in which the shifting of the vehicle is controlled in accordance with an operation performed by a driver who drives the vehicle. The second operation device is configured to receive a second switching operation to switch the shift mode from the manual shift mode to the automatic shift mode. The control apparatus includes a processor and a memory coupled to the processor. The processor is configured to count a switching time from a timing when a unit change amount which is an amount of change in a speed ratio per unit time becomes less than or equal to a predetermined value after the first switching operation is performed on the first operation device to a timing when the shift mode is switched from the manual shift mode to the automatic shift mode in accordance with the second switching operation performed on the second operation device, and update the switching time set as a switching condition for automatically switching the shift mode from the manual shift mode to the automatic shift mode to the switching time counted by the processor.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
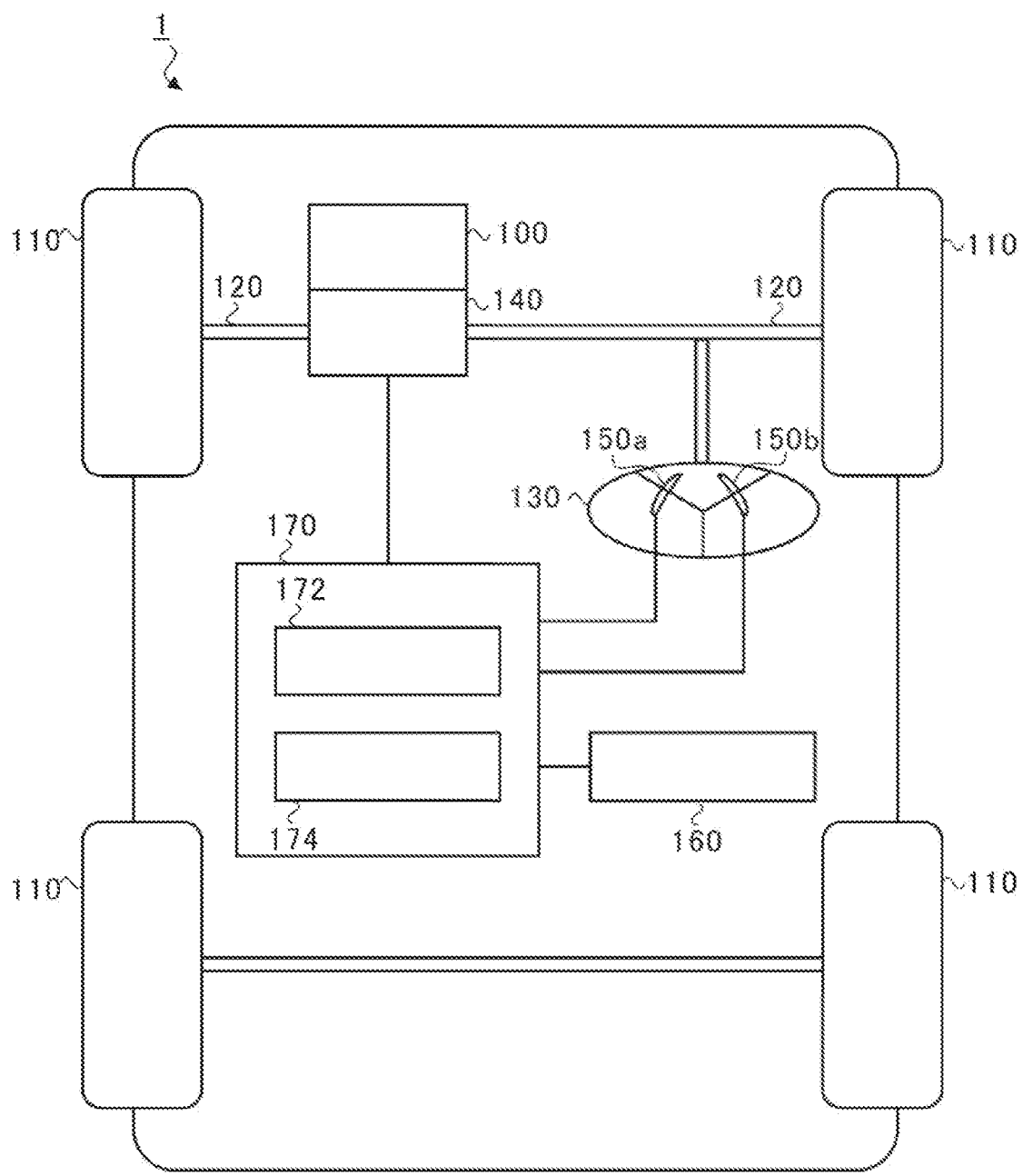
FIG. 1 is a schematic diagram illustrating a vehicle on which a shift mode control system according to one example embodiment of the disclosure is mounted.

In a case where a driver who drives a vehicle wants to change a current speed ratio (a current transmission gear) to a target speed ratio (a target transmission gear) in accordance with a current situation, for example, the driver manually switches the shift mode to the manual shift mode to achieve shifting. In this case, after changing the current speed ratio to the target speed ratio (the target transmission gear), the driver is not to perform a manual shifting operation. Accordingly, it is desired to immediately switch the manual shift mode to the automatic shift mode.

However, according to the existing technique disclosed in JP-A No. 2008-51262, for example, although a predetermined distance until the shift mode is automatically switched to the automatic shift mode is shortened in accordance with past operations of the driver, the timing of the switching to the automatic shift mode is uniformly controlled regardless of a speed ratio (a transmission gear). That is, in the existing technique, the shift mode is not immediately switched even when the speed ratio reaches a target speed ratio (a target transmission gear) set by the driver. Thus, in a case where the driver wants to switch the shift mode from the manual shift mode to the automatic shift mode after the speed ratio reaches the target speed ratio (the target transmission gear) and before a traveling distance of the vehicle reaches the predetermined distance, the driver has to perform a predetermined manual operation to switch the shift mode from the manual shift mode to the automatic shift mode. This makes the driver feel inconvenience.

It is desirable to provide a shift mode control system that makes it possible to appropriately switch the manual shift mode to the automatic shift mode.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided as needed. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[1. Overall Configurations of Vehicle and Shift Mode Control System]

First, an overall configuration of a vehicle 1 on which a speed mode control system according to a first example embodiment of the disclosure is mounted is described with reference to FIG. 1.

Note that the vehicle 1 according to the first example embodiment described below is a mere example of a vehicle on which the shift mode control system according to an example embodiment of the disclosure is mounted, and a vehicle on which the shift mode control system is mounted is not limited to the vehicle 1 according to the first example embodiment described below.

FIG. 1 schematically illustrates the vehicle 1 on which the shift mode control system according to the first example embodiment is mounted. The vehicle 1 may include an engine 100, drive wheels 110, drive shafts 120, a steering wheel 130, an automatic transmission 140, a minus paddle switch 150a, a plus paddle switch 150b, a shift lever 160, and a shift mode control apparatus 170. Hereinafter, the minus paddle switch 150a and the plus paddle switch 150b are collectively referred to as a paddle switch 150 as needed.

The engine 100 may be a drive source of the vehicle 1. The vehicle 1 may transmit a driving force from the engine 100 via the automatic transmission 140 and the drive shafts 120 to the drive wheels 110. The steering wheel 130 may be operated by the driver to achieve steering of the vehicle 1.

On the basis of a control command from the shift mode control apparatus 170 to be described later, the automatic transmission 140 may switch its shift range to convert the number of revolutions and torque of the engine 100 into ones appropriate for traveling. The automatic transmission 140 may be, for example, a continuously variable automatic transmission; however, it is non-limiting. The automatic transmission 140 may be, for example, another automatic transmission such as a multi-step automatic transmission of a planetary gear type.

The automatic transmission 140 may have three shift modes: an automatic shift mode (hereinafter referred to as an automatic mode), a manual shift mode (hereinafter referred to as a manual mode), and a temporary manual shift mode (hereinafter referred to as a temporary manual mode). In the automatic mode, the automatic transmission 140 may perform automatic shifting in accordance with a predetermined shifting characteristic. In the manual mode, the automatic transmission 140 may perform shifting in accordance with a driver's operation. In the temporary manual mode, the automatic transmission 140 may perform shifting in accordance with a driver's operation, as in the manual mode.

A driver who drives the vehicle 1 may switch the automatic transmission 140 between the three shift modes by operating the shift lever 160 to be described later. For example, to switch the automatic transmission 140 from the automatic mode to the manual mode, the driver may operate the shift lever 160 from a drive range (hereinafter referred to as a D range) to a manual range (hereinafter referred to as an M range). To switch the automatic transmission 140 from the manual mode to the automatic mode, the driver may operate the shift lever 160 from the M range to the D range. In addition, to switch the automatic transmission 140 from the automatic mode to the temporary manual mode, the driver may perform a paddle operation with the shift lever 160 being in the D range. In the paddle operation, the minus paddle switch 150a or the plus paddle switch 150b to be described later may be operated. The paddle operation may be an example of an operation for switching the automatic transmission 140 from the automatic mode to the temporary manual mode.

In a case where a predetermined condition is satisfied, the automatic transmission 140 may automatically switch from the temporary manual mode to the automatic mode. In order to forcibly switch the automatic transmission 140 from the temporary manual mode to the automatic mode at a timing desired by the driver, the driver may first operate the shift lever 160 from the D range to the M range, and thereafter perform a returning operation to return the shift lever 160 from the M range to the D range. The returning operation may be an example of an operation for switching the automatic transmission 140 from the temporary manual mode to the automatic mode.

The paddle switch 150 receives a switching operation to switch the shift mode from the automatic mode to the temporary manual mode. In one embodiment, the paddle switch 150 may serve as a "first operation device". The paddle switch 150 may be disposed on one side of the steering wheel 130 opposite to the other side of the steering wheel 130 facing a driver's seat. The paddle switch 150 may be disposed in such a manner that the driver makes it possible to operate the paddle switch 150 with the fingers while holding the steering wheel 130. The minus paddle switch 150a may be disposed to the left with respect to the center of the steering wheel 130, and the plus paddle switch 150b may be disposed to the right with respect to the center of the steering wheel 130. The paddle switch 150 may be coupled to the shift mode control apparatus 170 to be described later. When receiving a driver's operation, the paddle switch 150 may output a signal to the shift mode control apparatus 170.

The paddle switch 150 may receive a driver's shifting operation. The driver may operate one of the minus paddle switch 150a and the plus paddle switch 150b to thereby change a speed ratio. For example, in a case where the driver operates the minus paddle switch 150a, the speed ratio may be downshifted to a predetermined speed ratio. In a case where the driver operates the plus paddle switch 150b, the speed ratio may be upshifted to a predetermined speed ratio. When the driver performs the paddle operation while the shift mode is the automatic mode, the shift mode may be switched to the temporary manual mode.

The shift lever 160 receives a switching operation to switch the shift mode from the temporary manual mode to the automatic mode. In one embodiment, the shift lever 160 may serve as a "second operation device". In order to forcibly switch the automatic transmission 140 from the temporary manual mode to the automatic mode at a timing desired by the driver, the driver may perform the returning operation using the shift lever 160. The shift lever 160 may be disposed in the vicinity of the driver's seat of the vehicle 1 and receive a driver's operation to switch the shift range of the automatic transmission 140. The shift lever 160 may have a reverse range (hereinafter referred to as an R range), a neutral range (hereinafter referred to as an N range), and a parking range (hereinafter referred to as a P range) in addition to the D range and the M range. The shift lever 160 may further have an upshift range (hereinafter referred to as an M(+) range) and a downshift range (hereinafter referred to as an M(−) range). When the driver switches the shift lever 160 to the M(+) range or the M(−) range while the shift mode is the manual mode (i.e., while the shift lever 160 is in the M range), the speed ratio may be upshifted or downshifted to a predetermined speed ratio.

The shift mode control apparatus 170 is an example of a control apparatus that controls the shift mode. In one embodiment, the shift mode control apparatus 170 may serve as a "control apparatus". The shift mode control apparatus 170 may control the shift mode and the speed ratio of the automatic transmission 140, for example. As illustrated in FIG. 1, the shift mode control apparatus 170 includes a processor 172 and a memory 174 coupled to the processor 172.

The processor 172 may be an arithmetic processing unit mountable on a computer. The processor 172 may be, for example, a central processing unit (CPU) or a microprocessor. The processor 172 may include one or more processors. The processor 172 may execute a program stored in the memory 174 or another storage medium to thereby cause the shift mode control apparatus 170 to perform various processing.

The memory 174 may be a storage medium that stores programs and various kinds of data. The memory 174 may include, for example, a random access memory (RAM) and a read only memory (ROM). The ROM may be a non-volatile memory that stores programs to be used by the processor 172 and data for developing the programs. The RAM may be a volatile memory that temporarily stores variables, operation parameters, results of operations, and other data items. The program stored in the ROM may be read by the RAM and executed by the processor 172 which may be a CPU.

[2. Operational Configuration of Shift Mode Control System]

Figure 2:
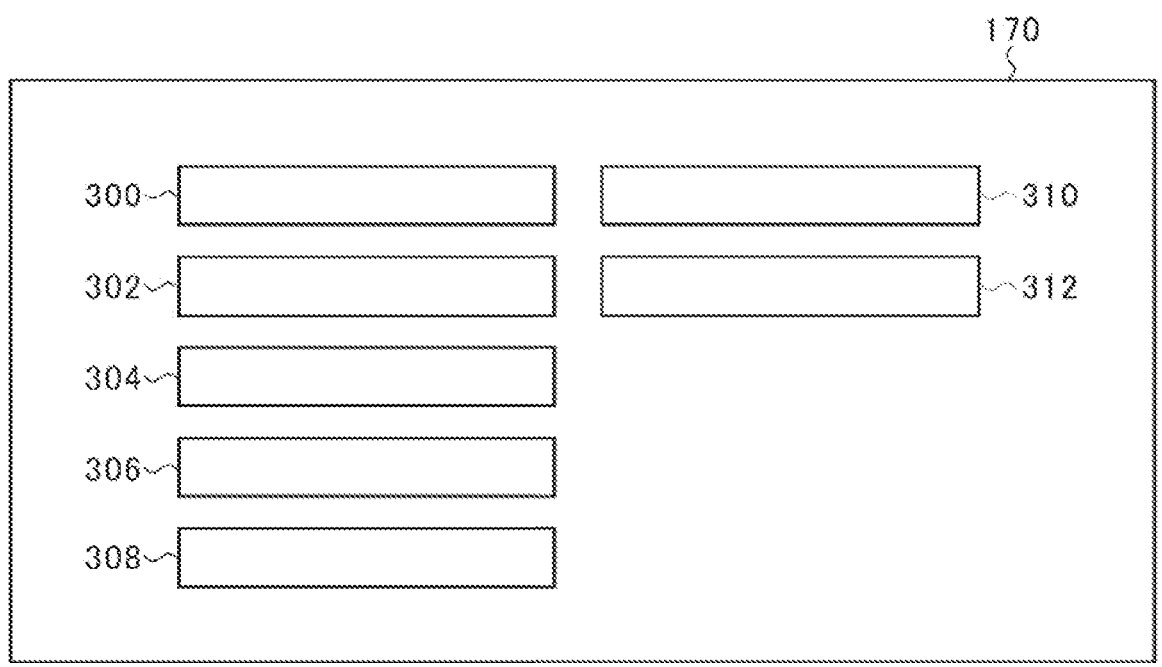
FIG. 2 is a block diagram illustrating an example of the configuration of the shift mode control system according to one example embodiment of the disclosure.

Next, an exemplary operational configuration of the shift mode control system according to the first example embodiment is described with reference to FIG. 2. FIG. 2 is a block diagram illustrating an exemplary operational configuration of the shift mode control system.

As illustrated in FIG. 2, the shift mode control apparatus 170 may include a paddle operation detector 300, a shift mode switch 302, a speed ratio detector 304, a speed ratio changer 306, a speed ratio change amount calculator 308, a switching condition updater 310, and a table memory 312. These components may be operated by executing programs.

The paddle operation detector 300 may detect a paddle operation performed by the driver. When the driver performs the paddle operation, for example, the paddle operation detector 300 may receive a signal from the paddle switch 150 to thereby detect that the paddle operation has been performed. For example, the driver may operate the minus paddle switch 150a once to downshift the speed ratio during traveling of the vehicle 1. The paddle operation detector 300 may receive a signal sent from the minus paddle switch 150a to thereby detect that the minus paddle switch 150a has been operated. In contrast, the driver may operate the plus paddle switch 150b once to upshift the speed ratio during traveling of the vehicle 1. The paddle operation detector 300 may receive a signal sent from the plus paddle switch 150b to thereby detect that the plus paddle switch 150b has been operated. The paddle operation detector 300 may receive the signal from the paddle switch 150 every time the paddle operation is performed to thereby detect that the paddle operation has been performed.

The shift mode switch 302 may determine whether the shift mode is to be switched on the basis of a driver's operation on the paddle switch 150 or the shift lever 160, and switch the shift mode if needed. For example, when the driver performs the paddle operation while a current shift mode is the automatic mode, the shift mode switch 302 may switch the shift mode from the automatic mode to the temporary manual mode. Further, when the driver switches the shift lever 160 to the D range, the shift mode switch 302 may switch the shift mode to the automatic mode, and when the driver switches the shift lever 160 to the M range, the shift mode switch 302 may switch the shift mode to the manual mode. Further, in a case where the driver performs the returning operation using the shift lever 160 while a current shift mode is the temporary manual mode, the shift mode switch 302 may switch the shift mode to the automatic mode.

In a case where no returning operation is performed by the driver, the shift mode switch 302 may determine whether the shift mode is to be switched on the basis of a shift mode switching condition (hereinafter simply referred to as switching condition). If the switching condition is satisfied, the shift mode switch 302 may automatically switch the shift mode from the temporary manual mode to the automatic mode. For example, the switching condition may be a condition that a speed ratio difference generated by shifting becomes greater than a speed ratio change amount set as the switching condition, which will be described in detail later. However, the switching condition is not limited to this example. For example, the switching condition may be a condition regarding whether a predetermined traveling time has elapsed or whether the vehicle 1 has traveled in a distance longer than a predetermined distance. In one example, the shift mode switch 302 may determine whether a difference between a first speed ratio set when the shift mode is switched from the automatic mode to the temporary manual mode in accordance with the paddle operation performed by the driver and the speed ratio set after the speed ratio is switched in accordance with the paddle operation on the paddle switch 150 performed by the driver is greater than or equal to the speed ratio change amount set as the switching condition. If the difference is greater than or equal to the speed ratio change amount set as the switching condition, the shift mode switch 302 may automatically switch the shift mode from the temporary manual mode to the automatic mode.

The speed ratio detector 304 may detect a current speed ratio. For example, the speed ratio detector 304 may detect the current speed ratio on the basis of the number of revolutions of the automatic transmission 140. The speed ratio detector 304 may store the detected speed ratio in the memory 174.

The speed ratio changer 306 may retrieve a target speed ratio to be set after the shifting, and send the automatic transmission 140 an instruction to change the current speed ratio to the target speed ratio. For example, in a case where the shift mode is the automatic mode, the speed ratio changer 306 may refer to a shifting map preliminarily stored in the memory 174 to retrieve an appropriate speed ratio from the shifting map, and send the automatic transmission 140 an instruction to change the current speed ratio to the retrieved speed ratio. In a case where the shift mode is the manual mode or the temporary manual mode, the speed ratio changer 306 may send the automatic transmission 140 an instruction to upshift or downshift the speed ratio to a predetermined speed ratio in accordance with a driver's operation on the paddle switch 150 or the shift lever 160.

The speed ratio change amount calculator 308 may calculate the speed ratio change amount. For example, the speed ratio change amount calculator 308 may calculate the speed ratio change amount by calculating a difference between the first speed ratio set when the automatic mode is switched to the temporary manual mode in accordance with a driver's operation on the paddle switch 150, and a second speed ratio set when the temporary manual mode is switched to the automatic mode in accordance with a driver's operation on the shift lever 160. Alternatively, the speed ratio change amount calculator 308 may calculate the speed ratio change amount by calculating a difference between the first speed ratio and a speed ratio changed following the instruction from the speed ratio changer 306 and detected by the speed ratio detector 304 as needed, for example. Still alternatively, the speed ratio change amount calculator 308 may calculate a unit change amount that is the amount of change per unit time in speed ratio detected by the speed ratio detector 304, for example, as needed.

The switching condition updater 310 may update the switching condition for automatically switching the shift mode. For example, the switching condition updater 310 may update the speed ratio change amount as the switching condition for automatically switching the shift mode from the temporary manual mode to the automatic mode.

While the vehicle is traveling in the temporary manual mode, the driver may perform the paddle operation to thereby change a current speed ratio to a speed ratio desired by the driver. In a case where the shift mode is not automatically switched after the speed ratio reaches the desired speed ratio, the driver may perform a manual operation to switch the shift mode from the temporary manual mode to the automatic mode. That is, the speed ratio set after the shift mode is changed by the manual operation by the driver may be a speed ratio desired by the driver. Thus, the shift mode control apparatus 170 may calculate the difference between the first speed ratio and the second speed ratio to thereby determine the speed ratio change amount that is the amount of change in speed ratio to the speed ratio desired by the driver. The shift mode control apparatus 170 may update the current speed ratio change amount and thereafter determine, on the basis of the updated speed ratio change amount, whether the speed ratio has reached to the speed ratio desired by the driver.

The switching condition updater 310 may update, for example, the speed ratio change amount set as the switching condition for automatically switching the shift mode from the temporary manual mode to the automatic mode to the speed ratio change amount calculated by the speed ratio change amount calculator 308.

In one example, the switching condition updater 310 may update the switching condition by updating the speed ratio change amount set as the switching condition to the speed ratio change amount recently calculated. In this case, if the driver operates the returning operation, the speed ratio change amount calculated at the timing of the returning operation may be set as the switching condition. This allows for immediate reflection of the switching condition.

The way to update the switching condition by the switching condition updater 310 is not limited to the example described above. For example, the switching condition updater 310 may calculate an average value of the speed ratio change amounts obtained through multiple times of recent calculations, and may update the switching condition to the average speed ratio change amount as the switching condition. In this case, the speed ratio change amount newly stored may be weighted by the switching condition updater 310 so as to be preferentially used over the other speed ratio change amounts stored. Accordingly, the average value of the speed ratio change amounts obtained through past calculations may be calculated. This allows the switching condition updater 310 to update the switching condition to a more accurate speed ratio change amount desired by the driver. In a case where the calculated speed ratio change amount is less than a predetermined value, the switching condition updater 310 may determine that the calculated speed ratio change amount is an abnormal value, and may exclude the calculated speed ratio change amount when updating the switching condition. Alternatively, the switching condition updater 310 may update the speed ratio change amounts obtained through recent calculations in a first-in, first-out (FIFO) manner.

The table memory 312 may store various kinds of control information, such as a switching condition table regarding the switching condition, in the memory 174. In the switching condition table, the first speed ratio may be correlated with the speed ratio change amount set as the switching condition. That is, the table memory 312 may store the speed ratio change amount updated by the switching condition updater 310 per unit of the first speed ratio.

[3. Flow of Process Performed by Shift Mode Control System]

Figure 3:
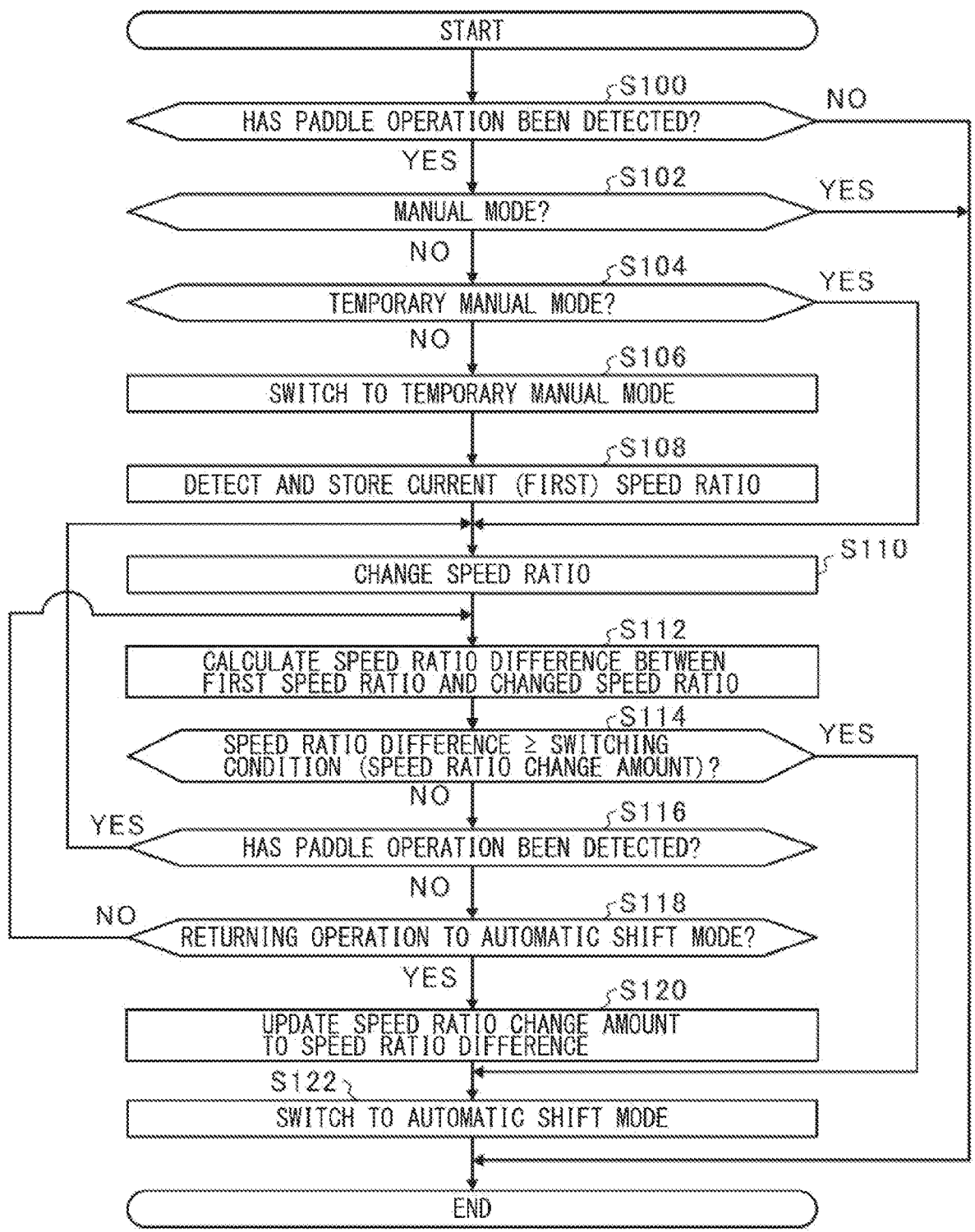
FIG. 3 is a flowchart of a shift mode switching process to be performed by a shift mode control apparatus according to one example embodiment of the disclosure.

Next, an exemplary flow of a process to be performed by the shift mode control apparatus 170 of the shift mode control system according to the first example embodiment is described with reference to FIG. 3. FIG. 3 is a flowchart of a shift mode switching process to be performed by the shift mode control apparatus 170 according to the first example embodiment.

As illustrated in FIG. 3, the paddle operation detector 300 may first detect, on the basis of a driver's operation on the paddle switch 150, whether the paddle operation has been performed by the driver (Step S100). For example, when the paddle operation is performed by the driver, the paddle switch 150 may send a signal to the paddle operation detector 300, and the paddle operation detector 300 may detect the signal. If no paddle operation is detected by the paddle operation detector 300 (Step S100: NO), the process may end.

If the paddle operation is detected by the paddle operation detector 300 (Step S100: YES), the shift mode switch 302 may determine whether a current shift mode is the manual mode (Step S102). If the current shift mode is the manual mode (Step S102: YES), the process may end. If the current shift mode is not the manual mode (Step S102: NO), the shift mode switch 302 may determine whether the current shift mode is the temporary manual mode (Step S104).

If the current shift mode is not the temporary manual mode (Step S104: NO), that is, if the current shift mode is the automatic mode, the shift mode switch 302 may switch the shift mode from the automatic mode to the temporary manual mode (Step S106). Thereafter, the speed ratio detector 304 may detect a current speed ratio (i.e., the first speed ratio) on the basis of the number of revolutions of the automatic transmission 140, and may store the current speed ratio in the memory 174 (Step S108).

After the current speed ratio is stored in Step S108 or if the current shift mode is determined to be the temporary manual mode in Step S104 (Step S104: YES), the speed ratio changer 306 may send the automatic transmission 140 an instruction to change the speed ratio in accordance with the paddle operation performed by the driver (Step S110). In a case where the driver operates the minus paddle switch 150a, the speed ratio changer 306 may send the automatic transmission 140 an instruction to downshift the speed ratio. In a case where the driver operates the plus paddle switch 150b, the speed ratio changer 306 may send the automatic transmission 140 an instruction to upshift the speed ratio.

After the speed ratio is changed, the speed ratio change amount calculator 308 may detect an actual speed ratio set after the changing of the speed ratio in Step S110, and may calculate a speed ratio difference between the first speed ratio stored in Step S108 and the actual speed ratio set after the changing of the speed ratio in Step S110 (Step S112).

After the speed ratio difference is calculated in Step S112, the shift mode switch 302 may determine whether the speed ratio difference calculated in Step S112 is greater than or equal to the speed ratio change amount set as the switching condition (Step S114). For example, the speed ratio change amount set as the switching condition may have a preset default value, and may be updated to a smaller value every time the speed ratio change amount is updated in Step S120.

If the speed ratio difference calculated in Step S112 is determined in Step S114 to be less than the switching condition (Step S114: NO), the paddle operation detector 300 may detect, on the basis of a driver's operation on the paddle switch 150, whether the paddle operation has been performed by the driver (Step S116). For example, when the paddle operation is performed by the driver, the paddle switch 150 may send a signal to the paddle operation detector 300, and the paddle operation detector 300 may detect the signal.

If the paddle operation is detected in Step S116 (Step S116: YES), the process may be repeated from Step S110. If no paddle operation is detected in Step S116 (Step S116: NO), the shift mode switch 302 may determine, on the basis of a driver's operation on the shift lever 160, whether the returning operation has been performed (Step S118).

If no returning operation is detected in Step S118 (Step S118: NO), the process may be repeated from Step S112. If the returning operation is detected in Step S118 (Step S118: YES), the switching condition updater 310 may update the speed ratio change amount set as the switching condition to the speed ratio difference calculated in Step S112 (Step S120). For example, the switching condition updater 310 may update the speed ratio change amount set as the switching condition by setting the speed ratio difference at the time of the returning operation as the speed ratio change amount. The table memory 312 may store the speed ratio change amount calculated in Step S112 per unit of the first speed ratio, and the switching condition updater 310 may update the speed ratio change amount calculated in Step S112 per unit of the first sped ratio.

After the speed ratio change amount set as the switching condition is updated in Step S120 or if the speed ratio difference is determined in Step S114 to be greater than or equal to the switching condition (Step S114: YES), the shift mode switch 302 may switch the shift mode from the temporary manual mode to the automatic mode (Step S122), and the process may end.

According to the vehicle 1 of the first example embodiment described above, when the driver switches the shift mode from the temporary manual mode to the automatic mode by a manual operation, the speed ratio change amount that is the difference between the first speed ratio and the second speed ratio is calculated. This allows the vehicle 1 to determine, on the basis of the speed ratio change amount, whether the speed ratio has reached a speed ratio desired by the driver. Further, the vehicle 1 updates the speed ratio change amount as the switching condition. Accordingly, in a case where the speed ratio is changed to a similar degree in the next and subsequent operations, it is possible for the vehicle 1 to determine whether the speed ratio has reached a speed ratio desired by the driver. This allows the vehicle 1 to switch the shift mode to the automatic mode immediately after the speed ratio change amount reaches the speed ratio desired by the driver. This reduces inconveniences to the driver regarding switching of the shift mode. Accordingly, it is possible in the first example embodiment to appropriately switch the shift mode from the manual shift mode to the automatic shift mode.

According to the vehicle 1 of the first example embodiment, the speed ratio change amount is updated as the switching condition per unit of the first speed ratio. Accordingly, it is possible to update the speed ratio change amount in accordance with the characteristic of the speed ratio. As the speed ratio change amount is updated in accordance of the characteristic of the speed ratio in the vehicle 1 of the first example embodiment, it is possible to appropriately determine the speed ratio desired by the driver and to surely reduce inconvenience to the driver regarding switching of the shift mode.

[4. Shift Mode Control System According to Second Example Embodiment]

Next, the vehicle 1 on which the shift mode control system according to a second example embodiment of the disclosure is mounted is described in detail with reference to FIG. 4. Note that, although the second example embodiment is different from the first example embodiment in an aspect described below, other configurations and operations in the second example embodiment are similar to those in the first example embodiment and thus the description thereof is omitted.

Figure 4:
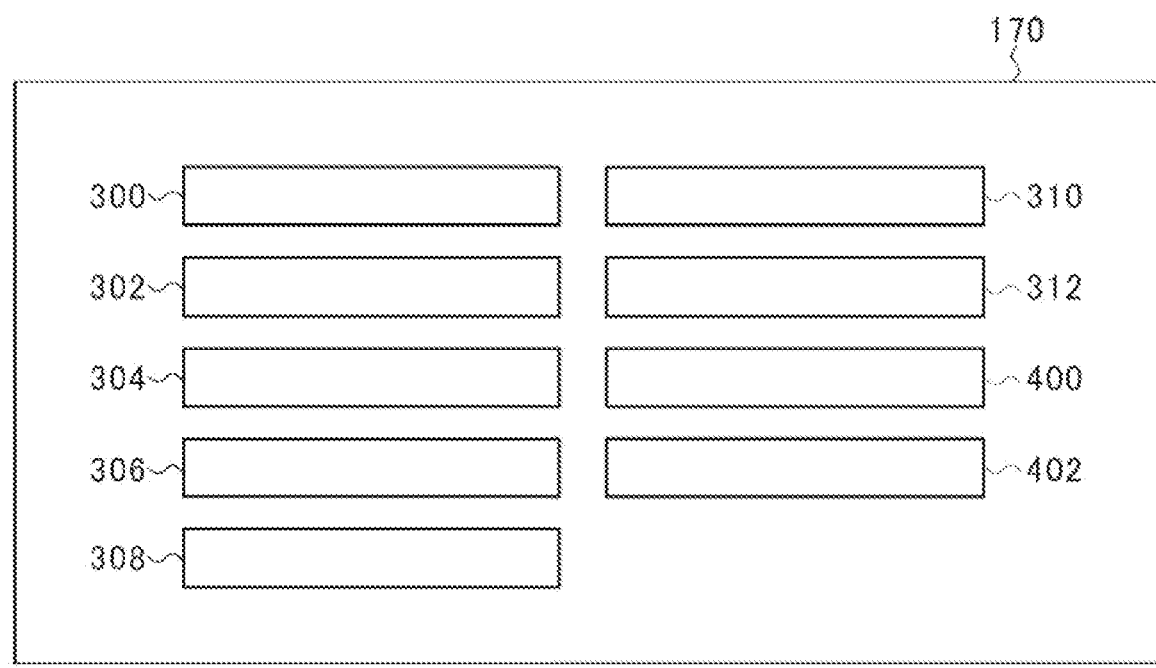
FIG. 4 is a block diagram illustrating an example of the configuration of the shift mode control system according to one example embodiment of the disclosure.

FIG. 4 is a block diagram illustrating an example of an operational configuration of the shift mode control system according to the second example embodiment. As illustrated in FIG. 4, the shift mode control apparatus 170 according to the second example embodiment may include a unit change amount determination unit 400 and a timer clocking unit 402 in addition to the paddle operation detector 300, the shift mode switch 302, the speed ratio detector 304, the speed ratio changer 306, the speed ratio change amount calculator 308, the switching condition updater 310, and the table memory 312 that are included in the shift mode control apparatus 170 according to the first example embodiment.

The unit change amount determination unit 400 may determine whether the unit change mount is less than or equal to a predetermined value. For example, the unit change amount determination unit 400 may determine whether the unit change amount calculated by the speed ratio change amount calculator 308 is less than or equal to the predetermined value.

The timer clocking unit 402 may count time from a predetermined timing. The predetermined timing may be a timing when the unit change amount determination unit 400 determines that the unit change amount is less than or equal to the predetermined value, for example. In one example, the timer clocking unit 402 may count a switching time from the timing when the unit change amount becomes less than or equal to the predetermined value after the driver operates the paddle switch 150 to the timing when the shift mode is switched from the temporary manual mode to the automatic mode in accordance with a driver's operation on the shift lever 160. The time counted by the timer clocking unit 402 may be stored in the memory 174.

The shift mode switch 302 may determine whether the time counted by the timer clocking unit 402 is longer than a switching time set as a switching condition for automatically switching the shift mode from the temporary manual mode to the automatic mode. If the time counted by the timer clocking unit 402 is longer than the switching time set as the switching condition, the shift mode switch 302 may switch the shift mode from the temporary manual mode to the automatic mode.

The switching condition updater 310 may update the switching time set as the switching condition for automatically switching the shift mode from the temporary manual mode to the automatic mode to the time counted by the timer clocking unit 402. For example, the switching condition updater 310 may update the switching time set as the switching condition to the time from a timing when the unit change amount becomes less than or equal to the predetermined value after the speed ratio is changed in accordance with the paddle operation performed by the driver to a timing when the shift mode is switched from the temporary manual mode to the automatic mode in accordance with the returning operation performed by the driver.

[5. Flow of Process Performed by Shift Mode Control System of Second Example Embodiment]

Figure 5:
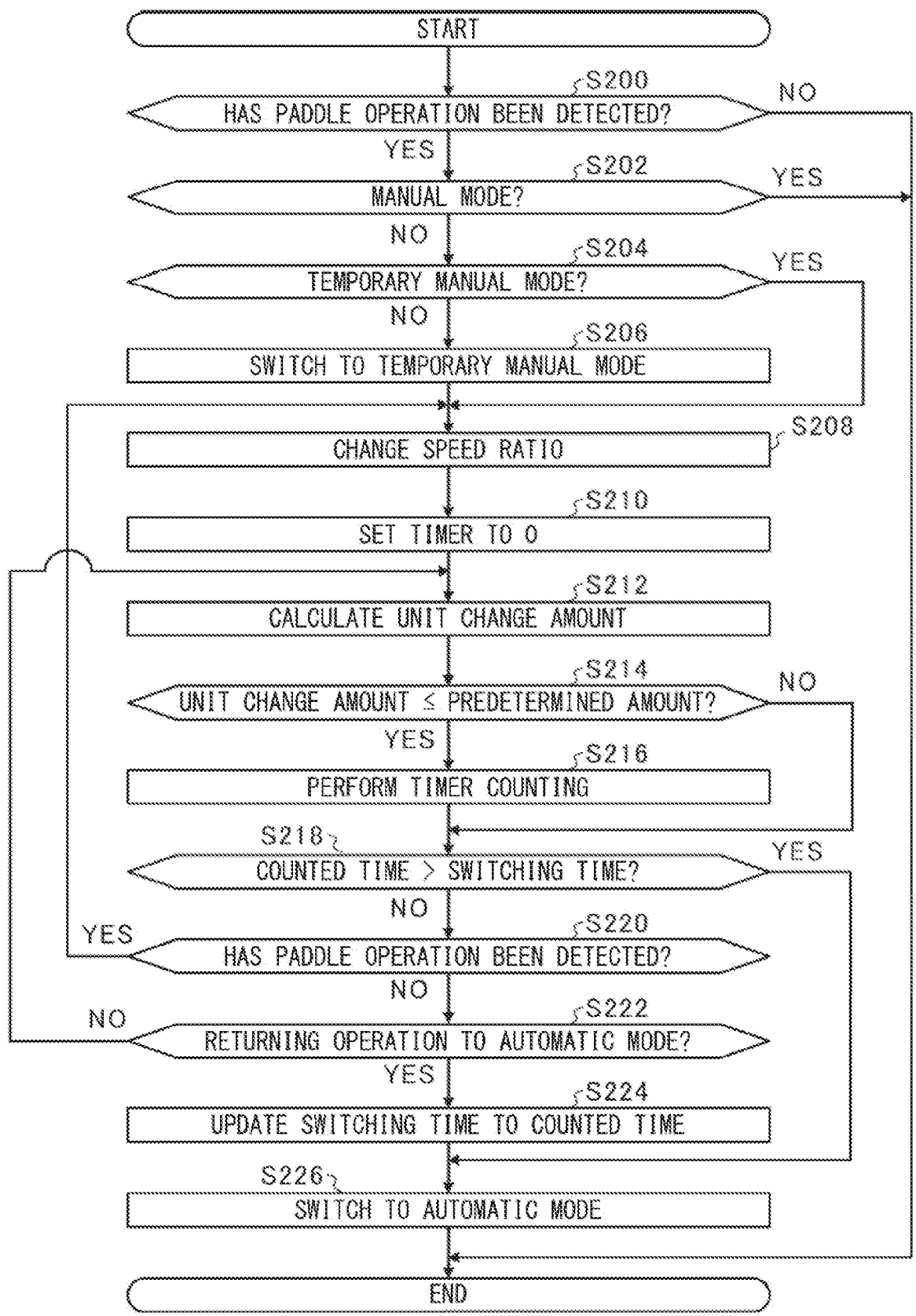
FIG. 5 is a flowchart of a shift mode switching process to be performed by the shift mode control apparatus according to one example embodiment of the disclosure.

Next, an exemplary flow of a process to be performed by the shift mode control apparatus 170 of the shift mode control system according to a second example embodiment is described with reference to FIG. 5. FIG. 5 is a flowchart of a shift mode switching process to be performed by the shift mode control apparatus 170 according to the second example embodiment.

As illustrated in FIG. 5, the paddle operation detector 300 may first detect, on the basis of a driver's operation on the paddle switch 150, whether the paddle operation has been performed by the driver (Step S200).

For example, when the paddle operation is performed by the driver, the paddle switch 150 may send a signal to the paddle operation detector 300, and the paddle operation detector 300 may detect the signal. If no paddle operation is detected by the paddle operation detector 300 (Step S200: NO), the process may end.

If the paddle operation is detected by the paddle operation detector 300 (Step S200: YES), the shift mode switch 302 may determine whether a current shift mode is the manual mode (Step S202). If the current shift mode is the manual mode (Step S202: YES), the process may end. If the current shift mode is not the manual mode (Step S202: NO), the shift mode switch 302 may determine whether the current shift mode is the temporary manual mode (Step S204).

If the current shift mode is not the temporary manual mode (Step S204: NO), that is, if the current shift mode is the automatic mode, the shift mode switch 302 may switch the shift mode from the automatic mode to the temporary manual mode (Step S206).

After the shift mode is switched in Step S206 or if the current shift mode is determined to be the temporary manual mode in Step S204 (Step S204: YES), the speed ratio changer 306 may send the automatic transmission 140 an instruction to change the speed ratio in accordance with the paddle operation performed by the driver (Step S208). In a case where the driver operates the minus paddle switch 150a, the speed ratio changer 306 may send the automatic transmission 140 an instruction to downshift the speed ratio. In a case where the driver operates the plus paddle switch 150b, the speed ratio changer 306 may send the automatic transmission 140 an instruction to upshift the speed ratio.

After the speed ratio is changed in Step S208, the timer clocking unit 402 may set a timer to zero (0) (Step S210). Thereafter, the speed ratio change amount calculator 308 may calculate the unit change amount (Step S212). For example, after the speed ratio is changed, the speed ratio change amount calculator 308 may divide a difference between two speed ratios detected by the speed ratio detector 304 at a predetermined interval by the predetermined interval, and may set the resultant value as the unit change amount.

After the unit change amount is calculated in Step S212, the unit change amount determination unit 400 may determine whether the unit change amount calculated in Step S212 is less than or equal to a predetermined value (Step S214). If the unit change amount is less than or equal to the predetermined value (Step S214: YES), the timer clocking unit 402 may perform timer counting (Step S216).

After the timer counting is performed in Step S216 or if the unit change amount is not determined in Step S214 to be less than or equal to the predetermined value (Step S214: NO), the shift mode switch 302 may determine whether the time counted by the timer clocking unit 402 is longer than the switching time set as the switching condition (Step S218). If the time counted by the timer clocking unit 402 is not determined to be longer than the switching time set as the switching condition (Step S218: NO), the paddle operation detector 300 may detect, on the basis of a driver's operation on the paddle switch 150, whether the paddle operation has been performed by the driver (Step S220). For example, when the paddle operation is performed by the driver, the paddle switch 150 may send a signal to the paddle operation detector 300, and the paddle operation detector 300 may detect the signal.

If the paddle operation is detected in Step S220 (Step S220: YES), the process may be repeated from Step S208. If no paddle operation is detected in Step S220 (Step S220: NO), the shift mode switch 302 may determine, on the basis of a driver's operation on the shift lever 160, whether the returning operation has been performed (Step S222).

If no returning operation is detected in Step S222 (Step S222: NO), the process may be repeated from Step S212. If the returning operation is detected in Step S222 (Step S222:

YES), the switching condition updater 310 may update the switching time set as the switching condition to the time counted by the timer clocking unit 402 (Step S224). For example, the switching condition updater 310 may update the switching time set as the switching condition by setting the time counted at the time of the returning operation as the switching time. The switching condition updater 310 may store the updated switching time in the memory 174, for example.

After the switching time set as the switching condition is updated in Step S224 or if the time counted by the timer clocking unit 402 is determined in Step S218 to be longer than the switching time (Step S218: YES), the shift mode switch 302 may switch the shift mode from the temporary manual mode to the automatic mode (Step S226), and the process may end.

According to the vehicle 1 of the second example embodiment described above, after the speed ratio is changed, the determination may be made as to whether the unit change amount of the speed ratio is less than or equal to the predetermined value. The vehicle 1 may count the time from the timing when the unit change amount of the speed ratio becomes less than or equal to the predetermined value to the timing when the driver changes the shift mode by a manual operation, and update the switching time set as the switching condition to the counted time. Accordingly, the vehicle 1 makes it possible to automatically switch the shift mode when the predetermined time elapses after the speed ratio is changed to the speed ratio desired by the driver in the next and subsequent operations. This reduces inconveniences to the driver regarding switching of the shift mode. Accordingly, it is possible also in the second example embodiment to appropriately switch the shift mode from the manual shift mode to the automatic mode.

Although some example embodiments of the disclosure have been described in the foregoing by way of example with reference to the accompanying drawings, the disclosure is by no means limited to the foregoing example embodiments. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the vehicle 1 of the foregoing example embodiments may be a vehicle provided with a driver monitoring system including an interior camera, for example. The table memory 312 may store a plurality of the switching conditions associated with each a plurality of drivers. When the driver monitoring system detects a driver associated with any one of the stored switching conditions, the switching condition updater 310 may update the stored switching condition associated with the driver detected by the driver monitoring system. This allows the vehicle 1 to update the switching condition for each driver detected by the driver monitoring system. Accordingly, even if the driver is changed, the switching condition for switching the shift mode from the temporary manual mode to the automatic mode may be changed for each driver. It is therefore possible to select a switching condition appropriate for a driver.

In the foregoing example embodiments, the speed ratio changer 306 may send the instruction to change the speed ratio, for example; however, this example is non-limiting. Alternatively, the speed ratio changer 306 may send an instruction to change a shifting step.

Further, in the foregoing example embodiments, one configuration example of the vehicle 1 is described with reference to FIG. 1; however, this example is non-limiting. The vehicle according to an example embodiment of the disclosure may be the vehicle 1 illustrated in FIG. 1 from which some components are removed and to which some components or some modifications are applied, for example.

Note that a series of the processes to be performed by the shift mode control system according to the foregoing example embodiments may be achieved by software, hardware, or a combination of software and hardware. A program included in the software may be preliminarily stored in a non-transitory storage medium disposed inside or outside each device, for example. The program may be read from the non-transitory storage medium such as a ROM to a transitory storage medium such as a RAM, and executed by a processor such as a CPU.

Further, according to the foregoing example embodiments, programs for achieving various operations of the shift mode control system may be provided. In addition, a computer-readable non-transitory storage medium containing these programs therein may be provided. Examples of the non-transitory storage medium may include disk storage medium such as an optical disk, a magnetic disk, or a magnetooptical disk and semiconductor memories such as a flash memory or a USB memory.

The invention claimed is:

1. A shift mode control system comprising:
   a control apparatus configured to control a shift mode of a vehicle;
   a first operation device configured to receive a first switching operation to switch the shift mode from an automatic shift mode in which shifting of the vehicle is automatically controlled to a manual shift mode in which the shifting of the vehicle is controlled in accordance with an operation performed by a driver who drives the vehicle; and
   a second operation device configured to receive a second switching operation to switch the shift mode from the manual shift mode to the automatic shift mode, wherein
   the control apparatus comprises a processor and a memory coupled to the processor, and
   the processor is configured to
   calculate a speed ratio change amount which is a difference between a first speed ratio set when the shift mode is switched from the automatic shift mode to the manual shift mode in accordance with the first switching operation performed on the first operation device and a second speed ratio set when the shift mode is switched from the manual shift mode to the automatic shift mode in accordance with the second switching operation performed on the second operation device, and
   update the speed ratio change amount set as a switching condition for automatically switching the shift mode from the manual shift mode to the automatic shift mode to the speed ratio change amount calculated by the processor.

2. The shift mode control system according to claim 1, wherein
   the processor is configured to
   store the speed ratio change amount per unit of the first speed ratio, and
   update the switching condition per unit of the first speed ratio.

3. A shift mode control system comprising:
   a control apparatus configured to control a shift mode of a vehicle;

a first operation device configured to receive a first switching operation to switch the shift mode from an automatic shift mode in which shifting of the vehicle is automatically controlled to a manual shift mode in which the shifting of the vehicle is controlled in accordance with an operation performed by a driver who drives the vehicle; and a second operation device configured to receive a second switching operation to switch the shift mode from the manual shift mode to the automatic shift mode, wherein the control apparatus comprises a processor and a memory coupled to the processor, and the processor is configured to count a switching time from a timing when a unit change amount which is an amount of change in a speed ratio per unit time becomes less than or equal to a predetermined value after the first switching operation is performed on the first operation device to a timing when the shift mode is switched from the manual shift mode to the automatic shift mode in accordance with the second switching operation performed on the second operation device, and update the switching time set as a switching condition for automatically switching the shift mode from the manual shift mode to the automatic shift mode to the switching time counted by the processor.

4. The shift mode control system according to claim 1, wherein the processor is further configured to determine the driver who is driving the vehicle, and update the switching condition associated with the determined driver.

5. The shift mode control system according to claim 2, wherein the processor is further configured to determine the driver who is driving the vehicle, and update the switching condition associated with the determined driver.

6. The shift mode control system according to claim 3, wherein the processor is further configured to determine the driver who is driving the vehicle, and update the switching condition associated with the determined driver.

* * * * *